May 22, 1923.
W. BERK
LAMP SUPPORT
Filed Aug. 3, 1921
1,456,297
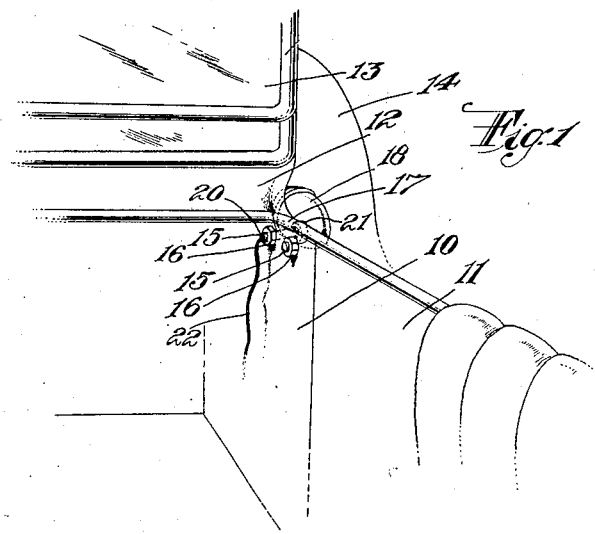
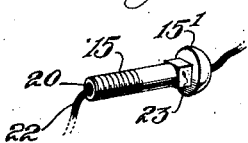
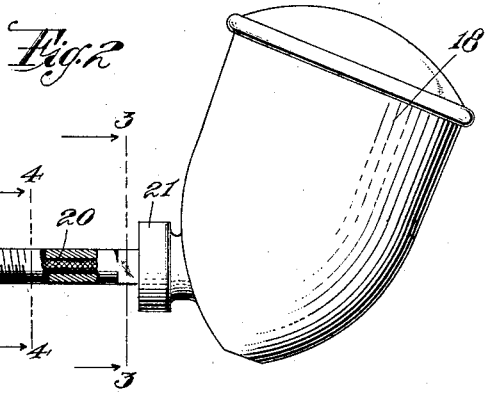
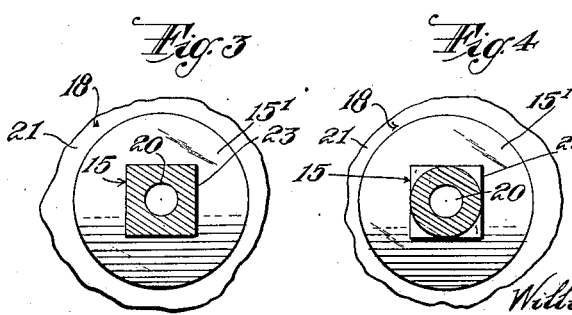
INVENTOR
William Berk
BY William S. Gluck
ATTORNEY Patented May 22, 1923.

1,456,297

UNITED STATES PATENT OFFICE.

WILLIAM BERK, OF NEW YORK, N. Y., ASSIGNOR TO AMERICAN AUTO LAMP CO., INC., OF NEW YORK, N. Y., A CORPORATION OF NEW YORK.

LAMP SUPPORT.

Application filed August 3, 1921. Serial No. 489,500.

*To all whom it may concern:*

Be it known that WILLIAM BERK, a citizen of the United States, and residing in Bronx County, city of New York, and State of New York, has invented a new and useful Improvement in Lamp Supports, of which the following is a specification.

This invention relates to affixing means, and more particularly to an arrangement whereby the driving lamp affixing means can be so combined with the already existing structure of an automobile as to permit of the attachment of a lamp to a car, without mutilation, disfigurement or machining.

As this invention is particularly intended for use in connection with Ford cars, the invention will be illustrated and described in connection with such cars, although as will be understood, this is for purpose of convenience only as to those aspects of the invention which call for a wider field of utility for the construction herein described.

As is well known, the larger and more expensive automobiles generally come equipped with lamps which not only serve utilitarian purposes for illumination, but, because of their shape or ornamentation, add to and enhance the appearance of the automobile itself. The lamp known as the "bullet" side lamp is an example of a popular type used, and my invention is therefore for purposes of convenience illustrated in connection therewith. The Ford automobile, however, as is well known, has no such lamps as standard equipment, nor is any provision made for their attachment. The result is that to attach lamps of the "bullet" side lamp type to a Ford automobile requires the drilling of a hole through the metal frame, or some similar operation, which is objectionable not only on the general ground of added cost of installation which requires special tools and a mechanic, but is objectionable on the further ground that such manner of installation causes a mutilation or disfigurement of the machine.

Among the more important objects of my invention therefore are: the provision of means for securing a lamp of the type described in position, without mutilating or cutting through any portion of the machine; the provision of so fashioning an element already existing in the machine as to permit of the ready attachment thereto of a lamp of the type described; the provision of a combined lamp supporting and car securing element; and the provision generally of a simplified inexpensive and compact arrangement for supporting the lamp in position on the machine.

In the attainment of the objects referred to, together with such additional benefits and advantages as may hereinafter appear or be pointed out, I have provided a construction, one embodiment of which is illustrated in the accompanying drawings in which—

Fig. 1 is a perspective view from inside the automobile of the right hand corner of the front thereof immediately below the windshield, showing particularly the bolts and nuts used in a Ford automobile, to connect the front frame to the side frame, with my invention in position;

Fig. 2 is a perspective view of the combined lamp support and car securing means removed from the automobile;

Fig. 3 is a section through Fig. 2 on lines 3—3 looking in the direction of the arrows;

Fig. 4 is a section through Fig. 2 on the line 4—4 also looking in the direction of the arrows; and Fig. 5 is a view of the modified bolt used in my invention.

Before proceeding to describe my invention, I will premise sufficient of the construction of an open type Ford car to show how my invention is used in its preferred form.

In Fig. 1, I have shown a portion of a stock Ford car in which the right side frame is shown at 10, with the front right door 11 mounted therein, the front frame 12, with the windshield 13 mounted thereabove, the right front fender being indicated at 14. The front and side frames 10 and 12 of a car of this type are secured together by horizontally positioned bolts and nuts such as those shown at 15 and 16 respectively, the bolts passing horizontally through the overlapping frames 10 and 12 at 17, which at this point are arranged at an angle to the transverse and longitudinal axes of the machine, the bolts 15 as a result extending through these overlapping parts at a similar angle. The bolt head 15' is arranged on the outside, and the nut 16 on the inside.

In Fig. 2 I have illustrated on an enlarged scale at 18, an electric automobile lamp, which merely for purpose of convenience and because of its desirable character, is illustrated as of the "bullet" type, and with which the higher priced automobiles are generally provided, the lamps being generally positioned on the front of the automobile, adjacent the lower end of the windshield, one on each side. The Ford car, however, not only does not come equipped with such lamps, but has no provision for the attachment thereof thereto. To attach such a lamp to a Ford requires cutting through the metal frame, which not only entails trouble and expense, but also mutilates the machine framing. To meet this situation, I have taken advantage of the presence of the bolts 15 used in the open type Ford automobile as described above in the manner which I will now proceed to describe.

This bolt 15 is preferably provided with a passage 20 therethrough and the lamp 18 provided with the annular depending flange 21 which is received over and secured to the bolt head 15' of the bolt 15 in any desired or preferred manner, the wiring 22 from the lamp passing through the passage 20 in the bolt 15 into the inside of the machine, and being connected to the source of electricity in any desired or preferred manner.

In the preferred practice, the bolt 15 may be originally in the form of a hollow bolt as clearly shown in Fig. 2, and the lamp 18 secured to the bolt head, and the wiring passed through the bolt as pointed out above. To secure this construction in position on the car, all that is necessary is to unloosen the nut 16, remove the bolt with which the Ford car is provided, and insert in the opening instead thereof, the bolt 15 secured to the lamp 18 in the manner indicated.

As pointed out previously, the bolts 15 are positioned horizontally, and angularly in the machine, and as the lamps 18 should be positioned longitudinally of the machine to obtain the desired lighting effect, I have so connected the lamp 18 to the bolt 15 as to secure substantially the obtuse angle therebetween, clearly shown in Fig. 2. When, therefore, the bolt 15 is positioned angularly in the machine, as described above, the lamp will assume a position substantially longitudinal of the machine.

If desired, the bolt 15 may be squared at 23 adjacent the bolt head 15', the opening therefore being similarly squared. In this manner, the added results are obtained of being enabled to affix the lamp in an accurately forward position and to secure the lamp in this position against a rotative movement.

Having thus described my invention and illustrated its use, what I claim as new and desire to secure by Letters Patent is the following.

1. An automobile lamp having a reduced exteriorly threaded portion projecting therefrom, the lamp adjacent said threaded portion being provided with a relatively enlarged portion, the relatively reduced portion forming the shank and the relatively enlarged portion forming the head of the bolt, the lamp, head and shank having a passage therethrough serving as a conduit for an electric conductor.

2. In combination with a vehicle, a hollow bolt for securing the front frame to a side frame, a locking nut threaded on one end of said bolt, and an electric lamp secured to the head of the bolt at the other end thereof, with the wiring passing therethrough.

In witness whereof, I have hereunder signed my name this 26th day of July, 1921.

WILLIAM BERK.